United States Patent [19]

Darroch

[11] 4,138,524
[45] Feb. 6, 1979

[54] STRUCTURAL ARTICLE WITH MOLDED PROTECTIVE EXPOSED SURFACE

[75] Inventor: Lloyd R. Darroch, Auckland, New Zealand

[73] Assignee: Aakronite Decoratives Limited, New Zealand

[21] Appl. No.: 746,280

[22] Filed: Dec. 1, 1976

Related U.S. Application Data

[63] Continuation of Ser. No. 581,200, May 27, 1975, abandoned, which is a continuation of Ser. No. 362,646, May 21, 1973, abandoned.

[30] Foreign Application Priority Data

May 25, 1972 [NZ] New Zealand .............. 167282

[51] Int. Cl.² ............ B29D 3/02; B29F 1/10; B32B 27/04
[52] U.S. Cl. .................. 428/217; 264/128; 264/271; 264/311; 428/218; 428/325; 428/406; 428/539; 428/911
[58] Field of Search .......... 428/409, 325, 217, 218, 428/406, 407, 539, 911; 264/128, 271, 311

[56] References Cited

U.S. PATENT DOCUMENTS

| | | | |
|---|---|---|---|
| 2,336,384 | 12/1943 | Baker et al. | 428/217 X |
| 2,646,364 | 7/1953 | Porth | 428/325 X |
| 2,944,821 | 7/1960 | Mason | 273/82 |
| 3,021,573 | 2/1962 | Bentov | 264/257 X |
| 3,052,927 | 9/1962 | Hoppe et al. | 264/311 X |
| 3,056,704 | 10/1962 | Rothweiler et al. | 264/128 X |
| 3,123,515 | 3/1964 | Barna | 428/328 X |
| 3,230,284 | 1/1966 | Iverson et al. | 264/245 X |
| 3,290,426 | 12/1966 | Barrentine | 264/311 X |
| 3,325,303 | 6/1967 | Lant et al. | 428/325 |
| 3,371,135 | 2/1968 | Goodwin | 264/63 |

Primary Examiner—Harold Ansher
Attorney, Agent, or Firm—Nilsson, Robbins, Dalgarn, Berliner, Carson & Wurst

[57] ABSTRACT

A method of forming an article defining an integral protective surface comprising providing a mould defining at least that face of the article to be formed with the protective surface, inserting a plurality of minute hard chemically inactive spheroidal members into a medium bonding substance of less specific gravity than the spheroidal members and in which the article, at least that part of the article at the relevant surface, is to be moulded, maneuvering the mould and placing the bonding substance therein, before or after the spheroidal members have been inserted, so as to cause the spheroidal members by their density displacing the bonding substance to migrate to form a compact layer at the aforementioned surface and allowing the substance to harden to retain the spheroidal members at that surface.

4 Claims, 1 Drawing Figure

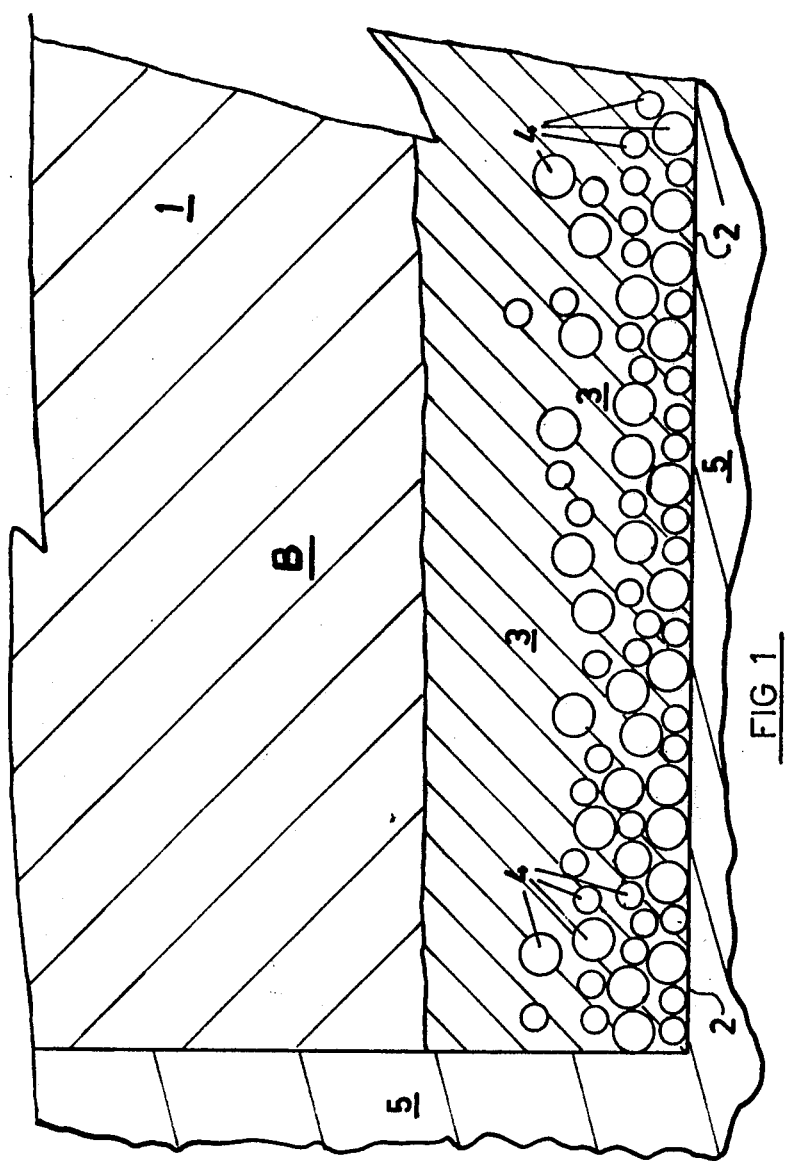

STRUCTURAL ARTICLE WITH MOLDED PROTECTIVE EXPOSED SURFACE

This application is a continuation of my application Ser. No. 581,200, filed May 27, 1975, now abandoned, which in turn is a continuation of my application Ser. No. 362,646, filed May 21, 1973, now abandoned.

This invention relates to protective surfaces and is particularly concerned with the provision of a protective surface integrally formed with an article.

An object of this invention is to provide a method of forming and an article having a durable protective surface owing to a combination of its hardness and low co-efficient of friction formed as an integral surface layer in structural articles, for example, a sink or basin bench or vanity top which will resist damage thereto owing to general usage, more particularly a protective surface that will resist chemical attack, degradation by sunlight or heat and abrasive or cutting action thereon.

According to one aspect of this invention there is provided a method or forming an article with an integral protective surface comprising providing a mould defining at least that face of the article to be formed with the protective surface, inserting a plurality of minute hard chemically inactive spheroidal members into a medium bonding substance of less specific gravity than the spheroidal members and in which the article, at least that type of the article at the relevant surface, is to be moulded, manoeuvring the mould and placing the bonding substance therein, before or after the spheroidal members have been inserted, so as to cause the spheroidal members by their density displacing the bonding substance to migrate to form a compact layer at the aforementioned surface and allowing the substance to harden to retain the spheroidal members at that surface.

According to a further aspect of this invention there is provided an article formed with an integral protective surface characterised in that a plurality of minute hard chemically inactive spheroidal members are bonded into the substance from which at least that part of the article at the relevant surface is moulded to form a compact layer at that surface, there compaction being result of their density displacing the medium bonding substance to migrate to that surface.

In further describing the invention, reference is made to the accompanying drawing (FIG. 1) which is a significantly enlarged sectioned diagrammatic figure illustrating formation of a fragment of an article incorporating the protective surface of the invention.

In a preferred form of the invention, an article, e.g. a bench top B includes a back surface 1 and an opposed protective surface 2 (shown as a line). The protective surface 2 (inverted in a mould and shown only in section) is integrally formed with the remainder of the bench top B during fabrication thereof. A suitable amount of polyester, acrylic or other suitable thermosetting resin substance 3 is prepared into which a plurality of minute spheroidal members 4 are introduced. The spheroidal members 4 are preferably in the form of glass beads, the combination of their hardness and their shape resulting in a surface with a low co-efficient of friction. Less hard members, such as nylon or silicone beads, of suitable density, having an inherent low co-efficient of friction are suitable alternatives.

The term spheroidal is used to indicate that the members 4 need not be perfectly spherical but as will be apparent from the following description, may be spherical, spheroidal or other closely similar bulbous formation.

The largest spheroidal members 4 utilised are of some 100 mesh size and preferably spheroidal members of different sizes are utilised such that the interstices between larger spheroidal members will accommodate smaller spheroidal members thus providing a more densely packed substantially interstice free layer, the members of which, being retained together, form the majority of the protective surface 2.

The medium substance 3 is chosen to be of less specific gravity than the spheroidal members 4 which are preferably inserted into the substance 3 prior to the substance 3 being placed into a mould 5 which, inter alia, defines the surface 2.

Preferably a mould 5 is formed from stainless steel with the inner faces thereof polished and preferably treated with a suitable release agent to facilitate removal of the subsequently formed bench top B. The mould 5 is arranged such that the face thereof that will form the inverted mating surface 2 of the bench top B resides substantially in a horizontal plane. Under the affect of gravity, the spheroidal members 4 (as illustrated), owing to their density will displace the bonding substance 3 and will migrate to the surface 2 adjacent the mould 5 to form a closely packed layer.

The substance 3 is formulated to gell preferably some five minutes after insertion in the mould 5 to allow time for the aforementioned migration of the spheroidal members 4. At a suitable interval thereafter, preferably after the mixture has firmed up, a suitable substrate substance may be inserted into the mould 5 to form the remainder of the body of the article B up to the back surface 1. Preferably the substrate material comprises a catalysed mixture of polyester resin and calcium carbonate or a similar filler which is cast onto the substance 3 as aforesaid and allowed to harden therewith to integrally form the bench top B with the protective surface 2. No line of demarcation is indicated in the figure and in that regard, it will be appreciated that articles may be manufactured (with the protective surface 2) in a single operation, the required medium substance 3 being prepared, the spheroidal member 4 added thereto and the resultant mixture moulded as described aforesaid to form both the "protective surface layer" (adjacent mould 5) and the main substrate body portion (adjacent the back surface 1) of the bench top B.

Upon hardening, the mould 5 may be removed and the previously-mated surface 2 buffed utilising a suitable cutting compound and subsequently polished to enhance the overall effect thereof. Decorative effects may be obtained by adding pigmentation, metallic flakes or the like into the medium substance thereby colouring same as required, the colouring being visible through, for example, translucent glass spheroidal members. Alternatively, coloured glass spheroidal members may be utilised to provide a colouring effect.

The method of this invention is not limited to bench tops or similar utility working tops as described aforesaid. As a further example, sheets, panels or tiles which, in situ, may be adhered or otherwise attached to a principal article to provide a protective surface therefor may be manufactured using the same method.

A modified method of forming the protective surface, which is particularly suitable for sheet or panel articles is by utilising conventional centrifugal moulding techniques. A suitable tubular mould may be rotated with the medium substance and the spheroidal members therein to centrifugally cause the migration of the spheroidal members to the inner face of the mould which defines the face of the sheet or panel at which the protective surface is required. At a suitable stage in the hardening process the resultant "sheet" may be withdrawn from the mould and laid flat for the final stage of the hardening process.

What is claimed is:

1. A structural non-laminate article with an integral protective exposed surface consisting of
    a moulded surface portion defined by a hardened mixture of solidified thermosetting carrier and a quantity of solids to substantially define said protective exposed surface and consisting essentially of a plurality of chemically inactive spheroidal members substantially of 100 mesh size, concentrated in a settled pattern at said surface and characteristically hard in relation to said carrier; and
    a non-surface support body integral with said moulded surface portion and extending between said spheroidal members, said body being defined substantially by a solid quantity of solidified thermosetting carrier that is less dense than said spheroidal members.

2. An article according to claim 1 wherein said support body comprises a solidified resin and calcium carbonate in combination.

3. An article according to claim 1 wherein said spheroidal members comprise a vitreous material.

4. An article according to claim 3 wherein said vitreous material comprises glass.

* * * * *